United States Patent [19]

Jarrett, III et al.

[11] Patent Number: 5,178,756
[45] Date of Patent: Jan. 12, 1993

[54] GLUCOSE-SILICA MEDIUM FOR HIGH-PRESSURE GEL FILTRATION CHROMATOGRAPHY

[76] Inventors: Harry W. Jarrett, III, 6088 Lessa La., Bartlette, Tenn. 38134; Huey G. Lee, 595 Jefferson Ave., Apt. 7, Memphis, Tenn. 38105

[21] Appl. No.: 720,646

[22] Filed: Jun. 25, 1991

[51] Int. Cl.$^5$ .............................................. B01D 15/08
[52] U.S. Cl. ............................ 210/198.2; 210/502.1; 210/635; 210/656; 502/404; 502/439
[58] Field of Search ...................... 210/635, 656, 198.2, 210/502.1; 502/404, 439; 530/413, 417

[56] References Cited

U.S. PATENT DOCUMENTS

| | | | |
|---|---|---|---|
| 3,947,352 | 3/1976 | Cuatrecasas | 210/31 |
| 4,111,838 | 9/1978 | Schaeffer et al. | 252/430 |
| 4,177,038 | 12/1979 | Biebricher | 210/198.2 |
| 4,324,689 | 4/1982 | Shah | 210/198.2 |
| 4,330,440 | 5/1982 | Ayers | 210/198.2 |
| 5,104,547 | 4/1992 | Cabrera | 210/656 |

OTHER PUBLICATIONS

Fried, "Protein Quantitation at the Picomole Level", Analytical Biochemistry 146, pp. 271–276 (1985).
Massom, "Trifluoperazine Binding to Porcine Brain Calmodulin" Biochemistry, Jan. 1990, 29, pp. 671–681.
R. E. Huisden, J. C. Kraak and H. Poppe, "*Journal of Chromatography*", vol. 508, pp. 289–299 (1990).
A. V. Kiselev, T. D. Khokhlova and Yu. S. Nikitin "*Chromatographia*", vol. 18, No. 2, pp. 69–72 (1984).
Chemical Abstract 95: 170125y, "Packing Material for Gel Permeation Chromatography", Showa Denko K. K., *Jpn. Kokai Tokkyo Koho*, 81 93,043, Jul. 28, 1981.

*Primary Examiner*—Ernest G. Therkorn
*Attorney, Agent, or Firm*—Luedeka, Hodges, Neely & Graham

[57] ABSTRACT

A method for preparing a pressure stable and pH stable medium for use in high pressure gel filtration chromatography (HPGFC). The method comprises treating aminoalkyl-silica with an aldose or ketose, monosaccharide or disaccharide sugar in the presence of sodium cyanoborohydride at a temperature of from about 50° C. to about 70° C. for a period of time of from about 4 hours to about 6 hours, washing the resulting medium, and drying the medium. a pressure stable and pH stable medium for HPGFC is also disclosed.

4 Claims, 10 Drawing Sheets

GLUCOSE-SILICA MEDIUM FOR HIGH-PRESSURE GEL FILTRATION CHROMATOGRAPHY

The present invention relates to media for separating biological molecules by high-pressure gel filtration chromatography (HPGFC). The invention also relates to methods for preparing such media.

Gel filtration is size-exclusion chromatography that uses aqueous solvents and hydrophilic packings. Low-pressure gel filtration media such as dextrans, agaroses, and polyacrylamides have been used both preparatively and analytically. In a manner similar to high-performance liquid chromatography (HPLC), high-pressure gel filtration chromatography (HPGFC) was developed to enhance the resolution and reduce the time requirements of gel filtration. The enhanced resolution necessarily implies that there is a much lower quantity of sample required for analytical purposes.

In recent years, HPGFC has been used extensively for quick isolation and analysis of proteins of interest. For example, Fried, et al., *Analytical Biochemistry*, Volume 146, pp. 271–276 (1985), has reported a rapid and sensitive protein assay employing HPGFC. More recently, Massom, et al., *Biochemistry*, Volume 29, pp. 671–681 (1990), has described a HPGFC method which is useful for studying ligand binding by proteins.

While the applications of HPGFC are potentially extensive and powerful, the current media used to separate the biological compounds are insufficient to provide resolution at or near the theoretical limits of HPGFC. For example, several of the current media have pressure limitations well below the capabilities of modern chromatographs. To obtain supports capable of withstanding high pressures, macroporous silicas have commonly been used. To minimize the interactions of silica and its ionizable silanols with the sample, the silica surface is often chemically modified with some hydrophilic silanizing reagent. Even so, currently available media, silica-based or non-silica-based, packed into columns often show mixed-mode chromatographic behavior consistent with some interactions between the applied sample and either the support surface or the hydrophilic modifying group attached to that surface.

It had been expected that coupling glucose to aminopropyl-silica would address the objections of the current media. Glucose would provide five additional hydroxyl groups to the silica surface for each molecule attached. As a result, hydrophilicity was expected to be enhanced on the surface and mobile solutes were expected to be protected from interacting with the silica. In short, columns prepared from glucose-silica were expected to show the increased resolution thought to be possible with HPGFC.

R. E. Huisden, et al., reported [in *Journal of Chromatography*, Volume 508, pp. 289–299 (1990)] the modification of silica with glucose for the preparation of media for the separation of proteins by high-performance liquid chromatography (HPLC). Aminopropyl-silica in methanol was treated with a ten-fold excess of glucose in the presence of ammonium chloride and sodium cyanoborohydride. After refluxing and washing with methanol, water, acetone, and diethyl ether, the glucose-silica media was recovered. Huisden, et al., noted that the retention volumes shifted after about 1 day and concluded that the glucose-silica media was very unstable and did not provide good shielding of the acidic silica surface. Accordingly, Huisden, et al., discontinued studying glucose-silica media and recommended the use of an epoxy-glucose silica for the separation of biological molecule rather than the simpler to prepare glucose-silica.

It is an object of the present invention to provide a medium for use in HPGFC columns which shows improved resolution over currently available media.

It is a further object of the present invention to provide a medium for use in HPGFC which is both pressure and pH stable.

In addition, it is an object of the present invention to provide a method for producing such a medium.

The present inventors have unexpectedly discovered a method for producing a pressure stable and pH stable sugar-silica medium for use in HPGFC columns. The method comprises the steps of reacting an aldose or ketose, monosaccharide or disaccharide sugar (such as glucose) with an aminoalkyl-silica (such as 3-aminopropyl-silica) in the presence of sodium phosphate, sodium cyanoborohydride and water. The reaction mixture is constantly stirred at 60° C. for five hours. The medium is then washed with water, and acetone and then dried at 60° C. In a preferred embodiment of the invention, the aldose or ketose sugar is selected from the group consisting of glucose, maltose or glucuronic acid.

The aminoalkyl-silica has a variety of pore sizes such as, for example, 60, 100, 300, or 500 Å. The sugar-silica medium is packed into a column for attachment to a high pressure liquid chromatograph. Such columns are typically, but not restricted to, 100 mm in length and 4.6 mm inside diameter (I.D.). Longer columns often will increase resolution while columns with larger I.D. will enable the processing of larger amounts of material.

It has been discovered that the columns packed with the sugar-silica medium of the present invention behave consistently with all types of proteins whether they are acidic (e.g., calmodulin, CaM), or basic (e.g., mellitin, Mel; or lysozome), large (e.g., immunoglobulin M, IgM), or small (e.g., Mel or Cytochrome c, Cyt C). That is, columns packed with media of the present invention will consistently separate the proteins by molecular weight. Unlike many currently used HPGFC media, the sugar-silica medium of the present invention is hydrophilic and shows much less interaction with lipophilic compounds than do current media. The medium of the current invention can also withstand pressures of over 5000 psi while many currently used polymeric resins can tolerate no more than about 30 psi. In addition, the sugar-silica columns are substantially stable with respect to varying pH. These columns have been stable for at least a year and have been useable for several hundred separations. Such columns prepared in accordance with the present invention provide a significant improvement upon existing HPGFC columns.

In order to provide a better understanding of the present invention, the following Figures, along with the following Examples, are given by way of illustration to show certain more specific details thereof.

DESCRIPTION OF THE PREFERRED EMBODIMENTS

Throughout the Examples, the chromatograph used was a Gilson 9000 Autoanalytical System outfitted with a Jasco UVDEC Detector, a Tandy 3000HD Computer and the Gilson 714 Software for data collection and analysis. All chromatography was at room temperature (20° C.) throughout.

EXAMPLE 1

Preparation of Glucose-silica

The starting material was 7 μm spherical 3-aminopropylsilica with various porosities. Silica of 60, 100, 300, and 500 Å pore sizes were used. When available, the silica gels were obtained from Alltech. When silicas of the appropriate pore size were not available, they were synthesized from 7 μm Macherey-Nagel silicas of the appropriate pore size as follows:

10 g of silica were refluxed from 4 to 6 hours in 20% (w/v) 3-aminopropyltrimethoxysilane (Petrarch) in toluene; the derivatized silica was then thoroughly washed with toluene, washed with methanol, and dried at 60° C. overnight.

A glucose-silica was prepared by reacting five ml (1 mmol) of 0.2 M D-glucose, 10 mM sodium phosphate, pH 6.8, and 126 mg (2 mmol) NaCNBH$_3$ per gram of aminopropyl-silica. The mixture was constantly stirred at 60° C. for five hours. The reacted resin was then washed with water, acetone, and then dried at 60° C. The dried glucose-silica was then tested with Cd-ninhydrin to check for unreacted amines. Typically, no unreacted amines were detected. Similar sugar-silicas are prepared using the same procedure with the aldehyde carbonyl of maltose or glucuronic acid in place of the aldehyde of glucose.

Figure 1:
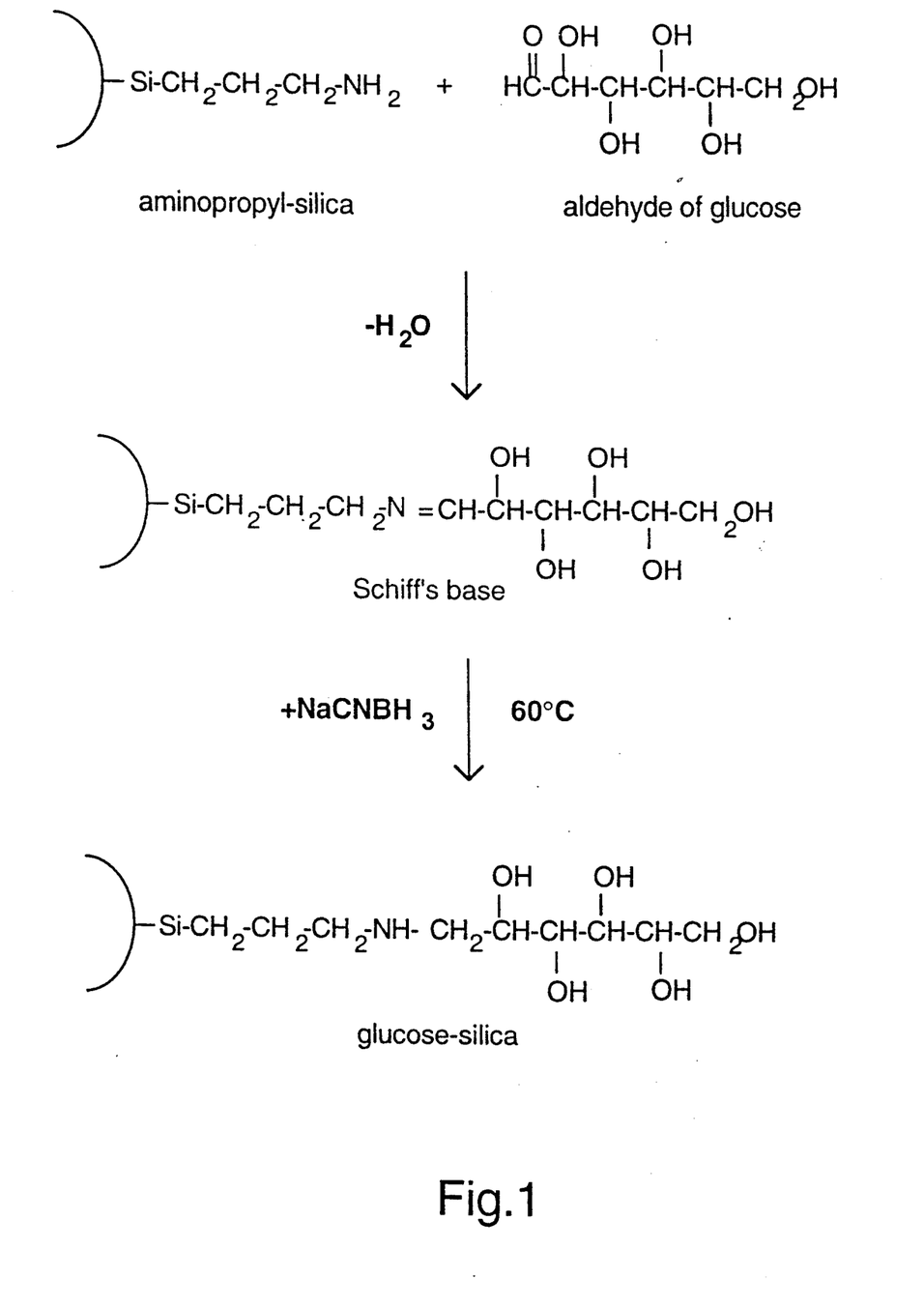
FIG. 1 is a diagram of a mechanism believed to occur during the reaction between an aminoalkyl-silica and the carbonyl of an aldose in the presence of sodium cyanoborohydride ($NaCNBH_3$) for producing the sugar-silica of the present invention.

It is believed that the reaction mechanism is that shown in FIG. 1. The aminopropyl-silica reacts with the aldehyde of glucose to form a Schiff's base. The Schiff's base is then reduced with sodium cyanoborohydride (NaCNBH$_3$) to form the stable glucose-silica.

Figure 2:
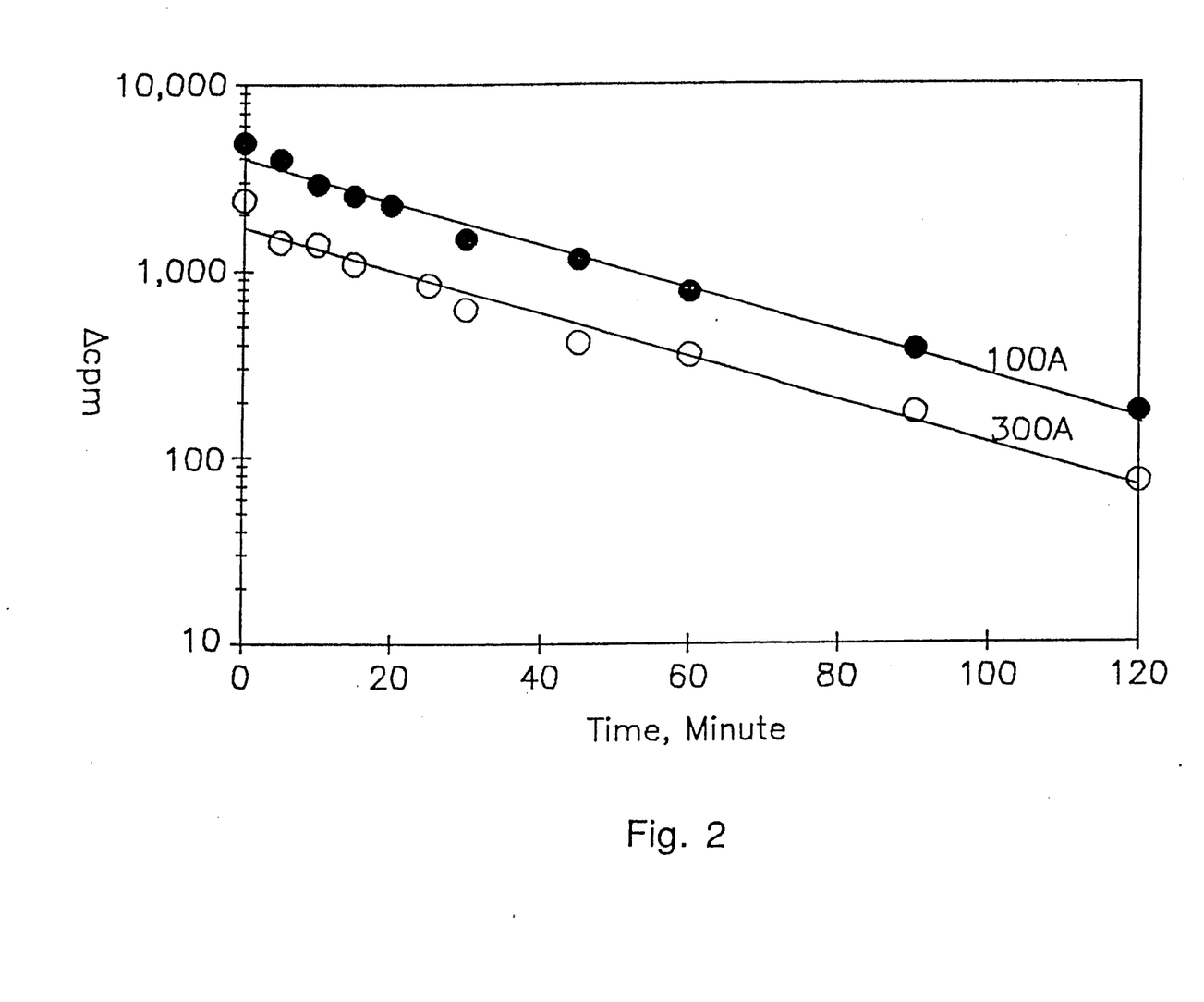
FIG. 2 is a diagram of the progress of the reaction between 100 Å and 300 Å pore size aminopropyl-silica and the aldehyde of glucose in the presence of NaCNBH$_3$ as monitored by [$^3$H] glucose.

In order to study the reaction rate of the reaction, approximately 600,000 cpm of [3-$^3$H] D-glucose (New England Nuclear) was added to the five ml reaction mixture. At various times, 0.2 ml portions of the reaction mixture were removed and mixed with 0.8 ml of 0.1 M hydrochloric acid to immediately terminate the reaction. After a brief centrifugation, duplicate 0.4 ml portions of the supernatant were mixed with five ml of scintillation fluid and the amount of [$^3$H] glucose was determined using a Packcard Tri-Carb 4640 scintillation counter. Silicas, removed from the centrifugation during the time course study were washed thoroughly and tested with the Cd-ninhydrin reagent. The reaction was followed for 100 Å and 300 Å pore aminopropyl-silica. As is seen in FIG. 2, the reaction was found to follow (pseudo) first order kinetics and the half time of the reaction was 26 minutes for the 300 Å and 28 minutes for the 100 Å silica with an average of 27 minutes overall. Therefore, the five hour reaction time would allow the reaction to be about 99.9% complete.

EXAMPLE 2

Column Testing

Glucose-silica supports of 60, 100, 300, and 500 Å pore sizes were made as described in Example 1 and packed into 100 mm×4.6 mm ID columns. The mobile phase was 100 mM sodium sulfate, 20 mM sodium phosphate, pH 6.8 with a flow rate of 1 ml/min throughout.

Figure 3:
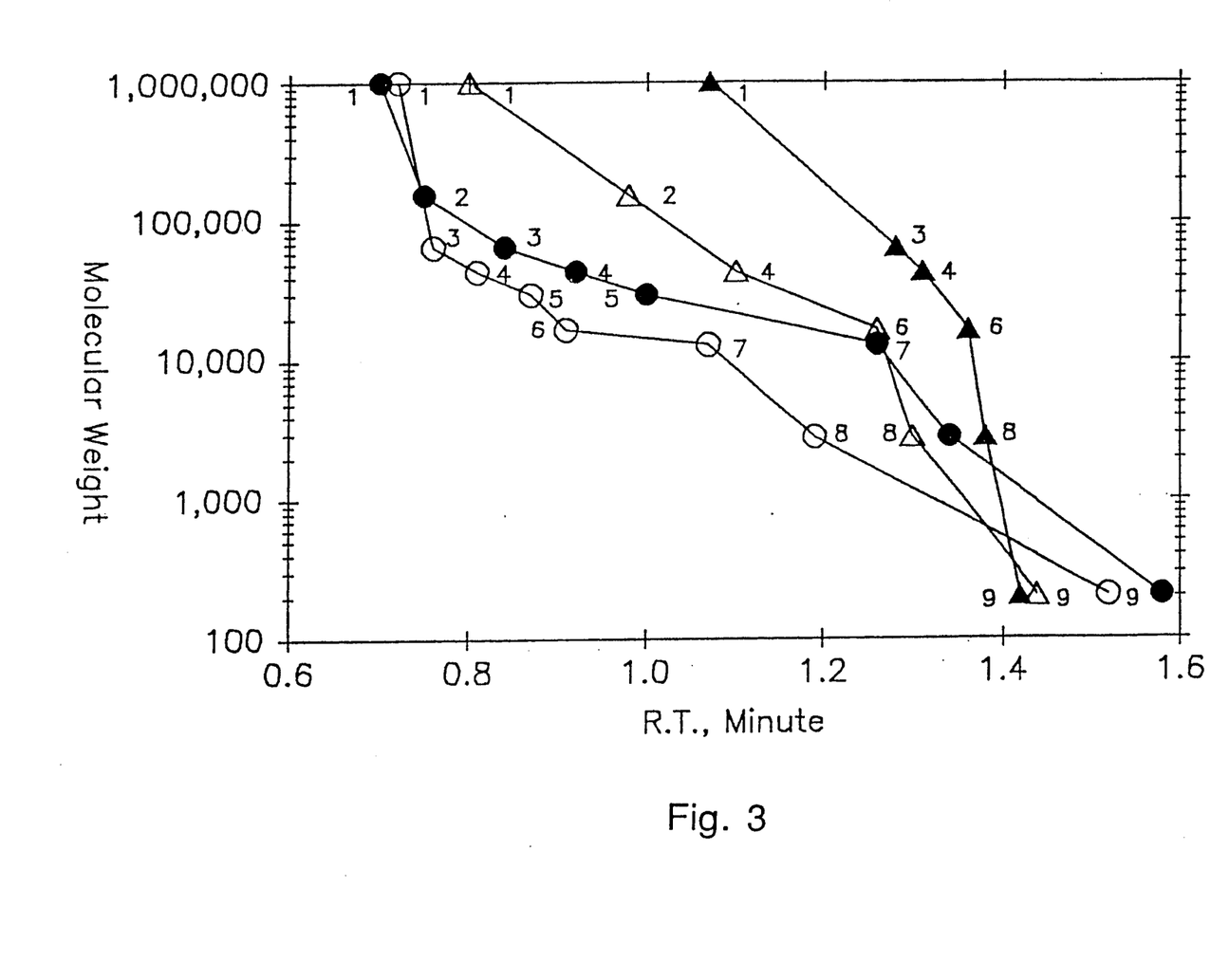
FIG. 3 is a diagram of the molecular weight versus retention time of proteins (1=immunoglobulin M, mol. wt. 1,000,000; 2=immunoglobulin G, mol. wt. 156,000; 3=bovine serum albumin. mol. wt. 66,300; 4=ovalbumin, mol. wt. 44,000; 5=carbonic anhydrase, mol. wt. 30,000; 6=bovine brain calmodulin, mol. wt. 16,700; 7=cytochrome C, mol. wt. 13,000; 8=bee venom mellitin, mol. wt. 2848; 9=tryptophan [an amino acid], mol. wt. 204) separated on glucose-silica columns (100 mm×4.6 mm ID) of different pore sizes (open circles=60 Å; closed circles=100 Å; open triangles=300 Å; closed triangles=500 Å)

The glucose-silica columns (60, 100, 300, and 500 Å) were tested with protein sizes ranging from immunoglobulin M (mol. wt. one million) to bee venom melittin (mol. wt. 2848). FIG. 3 shows the plots of molecular weight versus retention time for the various pore sizes and demonstrates the ability of glucose-silica to resolve proteins of different size classes. Columns with larger pore sizes (e.g., 300 and 500 Å) were capable of resolving larger proteins better than columns with smaller pores (e.g., 60 and 100 Å).

EXAMPLE 3

Resolution Comparison With the Prior Art

A mixture of three proteins [bovine serum albumin (BSA), calmodulin (CaM) and cytochrome C (CyT C)] and the amino acid tryptophan (Trp) was injected into five different columns.

Figure 4A:
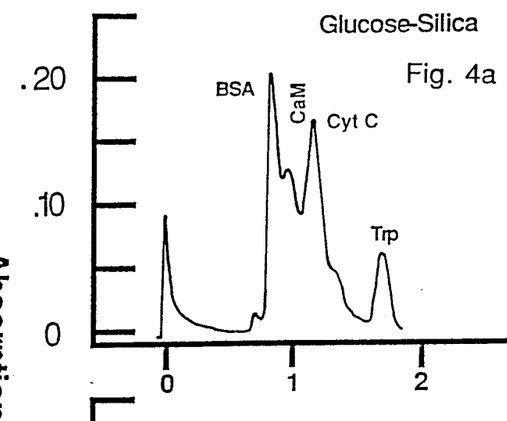
FIGS. 4A, 4B, 4C, and 4D are representations of four chromatograms (Absorption at 220 nm versus retention time) for four different HPGFC columns (4a=60 Å pore glucose-silica in a 100 mm×4.6 mm ID column; 4b=Macrosphere GPC 60 [60 Å pore diol-silica in a 100 mm×4.6 mm ID column]; 4c=Synchropak GPC 60 [60 Å pore proprietary silica in a 100 mm×4.6 mm ID column]; 4d=Macrosphere/R GPC [20 Å pore methacrylate derivative in a 250 mm ×4.6 mm ID column]) separating a sample comprising three proteins (BSA=bovine serum albumin; CaM calmodulin; and Cyt C=cytochrome c) and an amino acid (Trp=tryptophan)
Figure 4B:
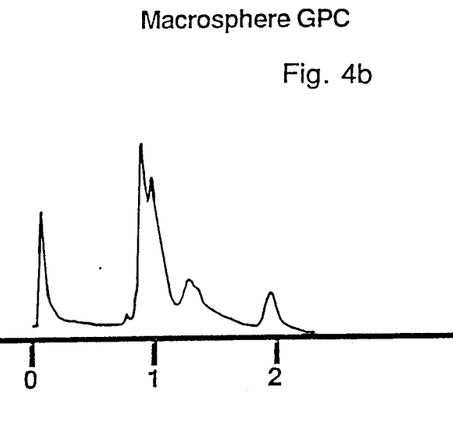
Figure 4C:
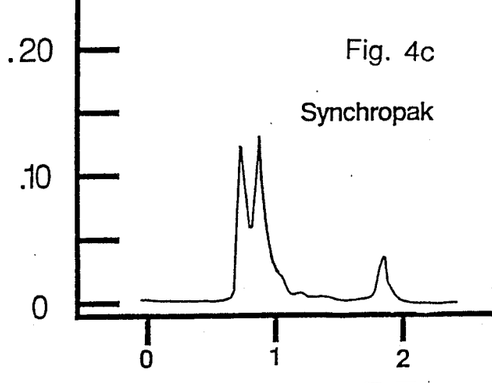
Figure 4D:
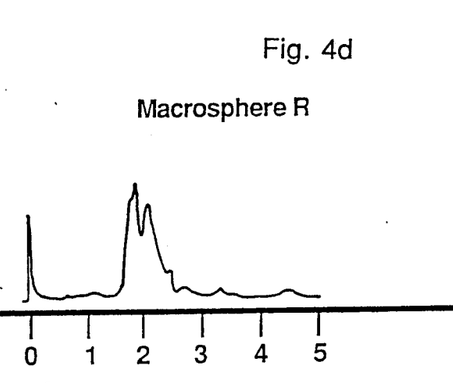
Figure 5A:
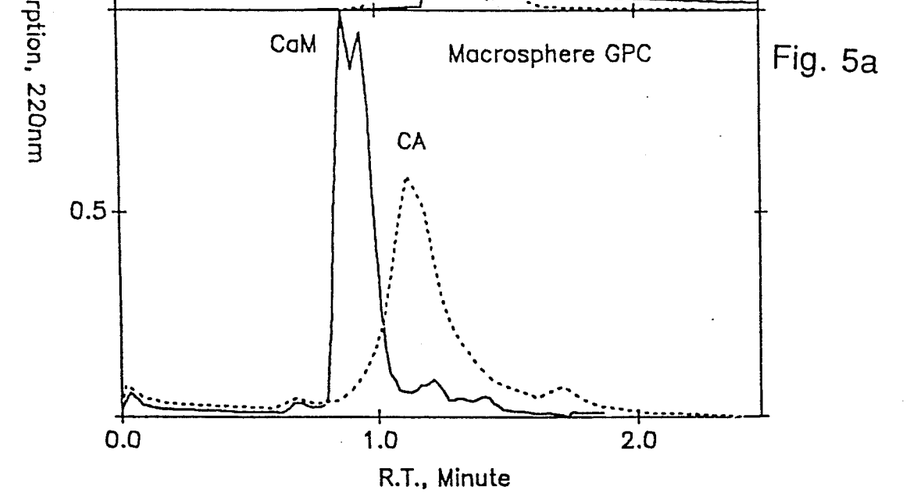
FIGS. 5A and 5B are representations of chromatograms (absorption at 220 nm versus retention time) for two different HPGFC columns (5a=60 Å pore glucose-silica in a 100 mm×4.6 mm ID column; 5b=Macrosphere GPC 60 [60 Å pore diol-silica in a 100 mm×4.6 mm ID column] showing the profiles of two proteins (CaM=calmodulin, mol. wt. 16,700; CA=carbonic anhydrase, mol. wt. 30,000)
Figure 5B:
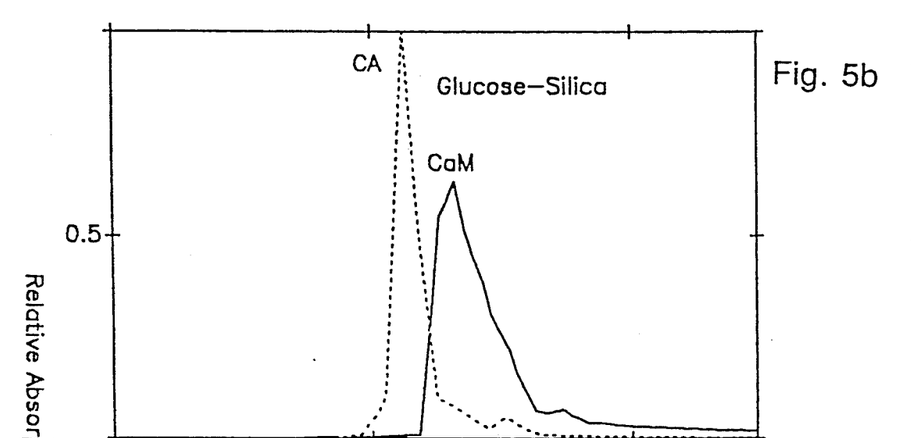

Injection of the mixture into a glucose-silica column (60 Å pore in 100 mm×4.6 mm ID column) produces four distinct and well separated peaks as is shown in FIG. 4a. In contrast, injection of the mixture into columns generally used in the prior art produces chromatograms of far less resolution and separation. Both the SynchroPak GPC 60 and Macrosphere/R GPC could not resolve all four components in the mixture, yielding rather three and two peaks, respectively (See FIGS. 4c and 4d). No peaks were observed at all with the use of a RoGel column (70 Å pore polystyrene resin in a 100 mm×4.6 mm ID column, data not shown). It is believed that all of the components of the mixture became bound to the column. Although the Macrosphere GPC 60 (60 Å pore diol-silica in a 100 mm×4.6 mm ID column) was able to resolve all of the components in the mixture, the chromatogram of the individual proteins in the mixture showed that the retention time was not strictly dependent on protein size with that column. In fact, the Macrosphere GPC 60 support apparently had a strong repulsive interaction with acidic proteins such as calmodulin. This effect is also shown FIG. 5b for calmodulin (mol. wt. 16,700) which actually elutes before carbonic anhydrase (mol. wt. 30,000) from the Macrosphere GPC 60 column. These proteins eluted in the proper order from the glucose-silica column (FIG. 5a). In addition, the retention time on the glucose-silica medium is wholly consistent with each protein's molecular weight.

Figure 6A:
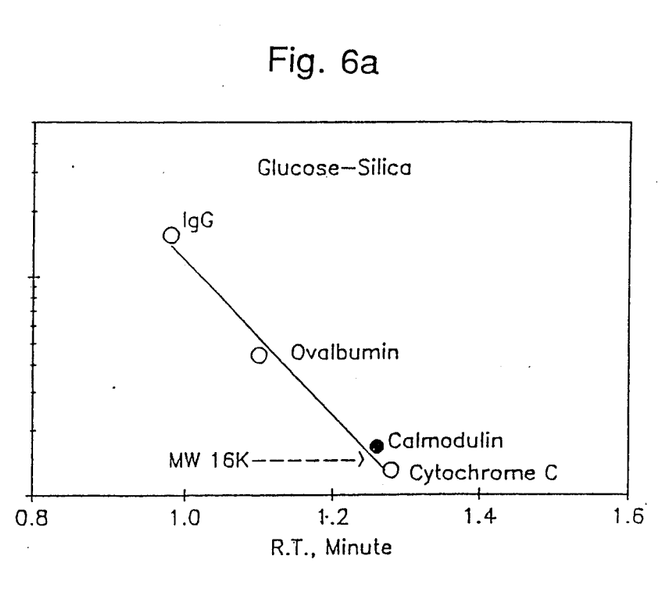
FIGS. 6A and 6B are diagrams of the molecular weight versus retention time of proteins (IgG=immunoglobulin G, mol. wt. 156,000; ovalbumin, mol. wt. 44,000; calmodulin, mol. wt. 16,700; myoglobin, mol. wt. 17,000; cytochrome c, mol. wt. 13,000) separated on two different HPGFC columns (6a=60 Å pore glucose-silica in a 300 mm×6.2 mm ID column; 6b=BioSil TSK-125 with a proprietary silica in a 300 mm×7.5 mm column)
Figure 6B:
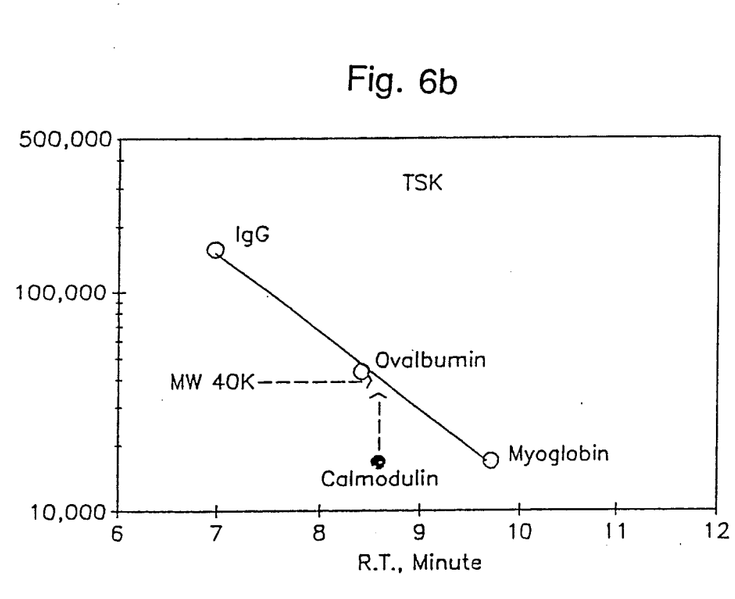

A similar phenomenon was also observed with a BioSil TSK 125 column (with a proprietary silica in a 300 mm×7.5 mm column). In a manner similar to Example 3, individual proteins (immunoglobulin G, ovalbumin, calmodulin, myoglobin, and cytochrome C) were injected into a glucose-silica column (60 Å pore glucose-silica in a 300 mm×6.2 mm ID column), see FIG. 6a, and into the BioSil TSK 125 column, see FIG. 6b. Calmodulin was found to elute too soon for its small size on the BioSil column. The acidic calmodulin behaved as though it was a 40,000 molecular weight protein on the BioSil column. In contrast, the glucose-silica column, once calibrated with the same standard proteins, gave a molecular weight for calmodulin of 16,000, which is entirely consistent with its actual molecular mass of 16,700.

EXAMPLE 4

Comparison of Resolution

Figure 7A:
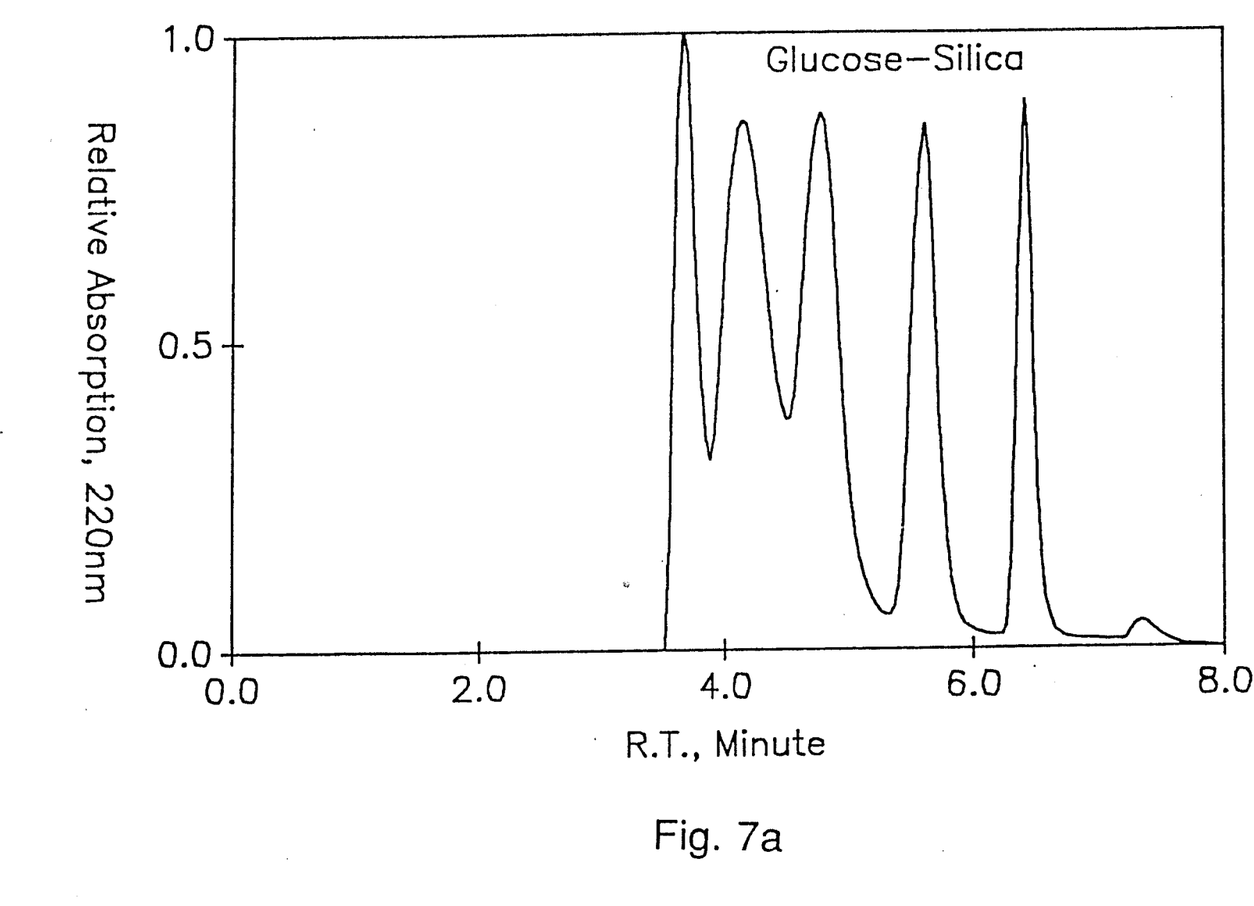
FIGS. 7A and 7B are representations of two chromatograms (relative absorption at 220 nm versus retention time) for two different columns (7a=60 Å pore glucose-silica in a 300 mm×6.2 mm ID column; 7b=BioSil TSK 125 with a proprietary silica in a 300 mm×7.5 mm column) showing the resolution of a mixture of proteins (in order of elution: "protein aggregate"; thyroglobulin, mol. wt. 670,000; immunoglobulin G, mol. wt. 156,000; ovalbumin, mol. wt. 44,000; myoglobin, mol. wt. 17,000; vitamin B$_{12}$, mol. wt. 1350)
Figure 7B:
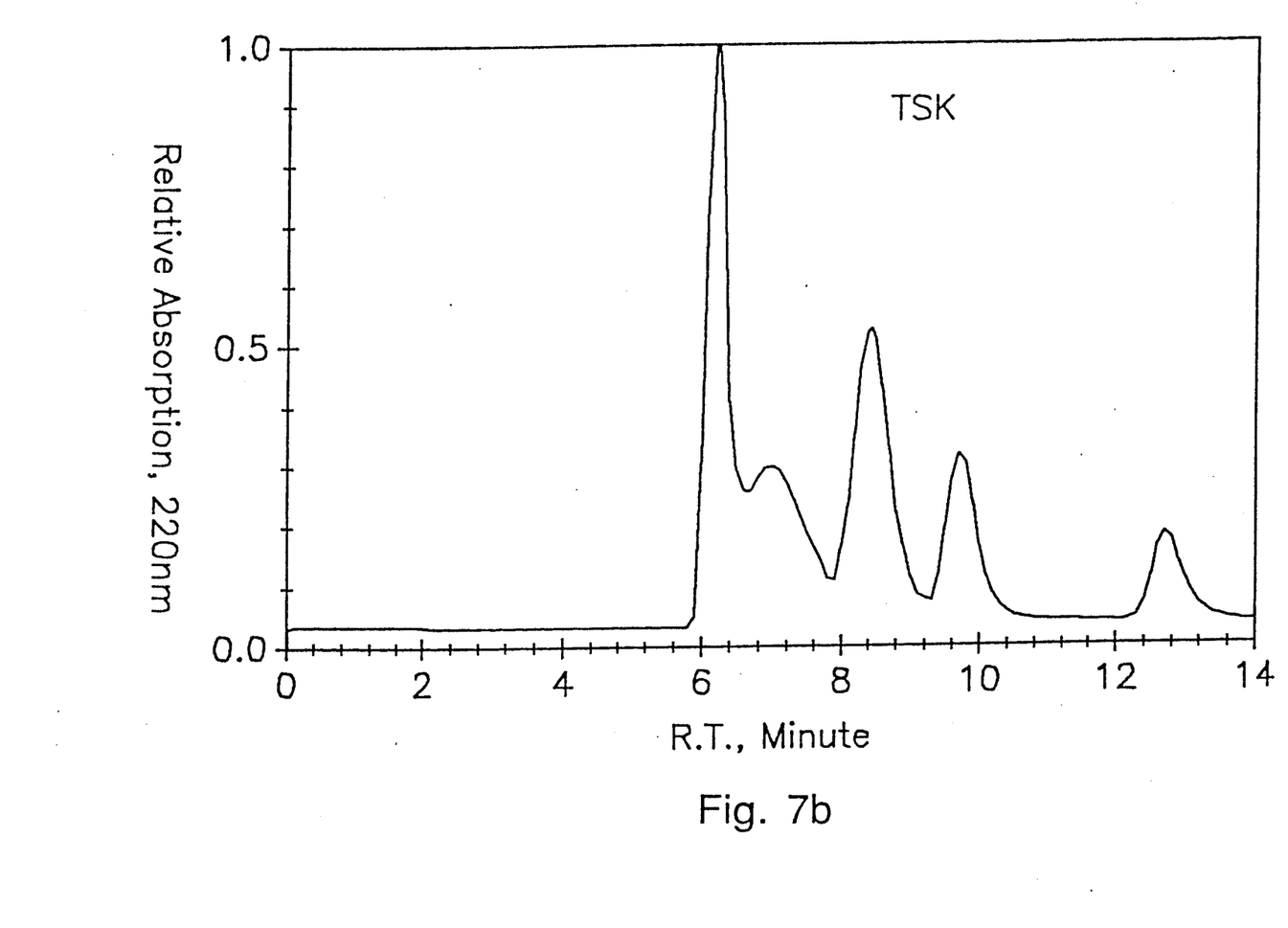

A protein standard test mixture (Bio-Rad) was injected into a glucose-silica column (60 Å pore in a 300 mm×6.2 mm ID column) and into a BioSil TSK 125 (a proprietary silica in a 300 mm×7.5 mm column). As is shown in FIG. 7, the glucose-silica column (see FIG. 7a), although smaller than the Bio-Sil column, was capable of resolving all six components of the standard test mixture. The Bio-Sil column resolved only five of the six components. In addition, the glucose-silica column gave sharper peaks than the BioSil column.

EXAMPLE 5

Improving Resolution with Tandem Columns

Figure 8:
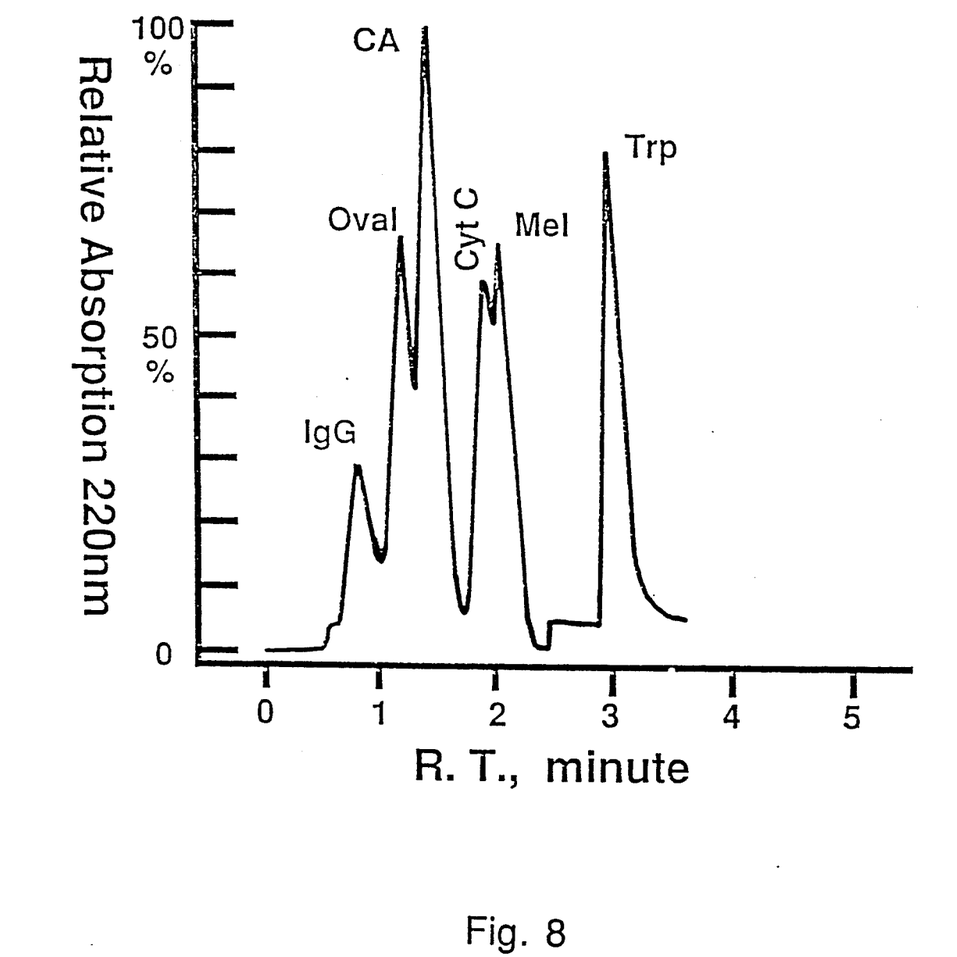
FIG. 8 is a representation of a chromatogram (relative absorption at 220 mm versus retention time) for a column comprising two 100 mm×4.6 mm ID columns (one with 100 Å pore glucose-silica, and the other with 300 Å pore glucose-silica) connected outlet to inlet showing the resolution of a mixture of five proteins (IgG=immunoglobulin G, mol. wt. 156,000; Oval=ovalbumin, mol. wt. 44,000; CA=carbonic anhydrase, mol. wt. 30,000; Cyt C=cytochrome C, mol. wt. 13,000; Mel=mellitin, mol. wt. 2848) and an amino acid (trp=tryptophan, mol. wt. 204)

To investigate whether a combination of pore sizes might extend the range of the glucose-silica column, a mixture of five proteins (immunoglobulin G, ovalbumin, carbonic anhydrase, cytochrome C, and mellitin) and an amino acid (tryptophan) was injected into a column comprising two 100 mm×4.6 mm ID columns, one with 100 Å pore glucose-silica and the other with 300 Å pore glucose-silica. As is shown in FIG. 8, all constituents were well resolved after three minutes at a flow rate of 1 ml/min. It is believed that the larger pore column primarily separated the larger proteins while the smaller pore column primarily separated the smaller proteins.

EXAMPLE 6 pH Stability

Figure 9:
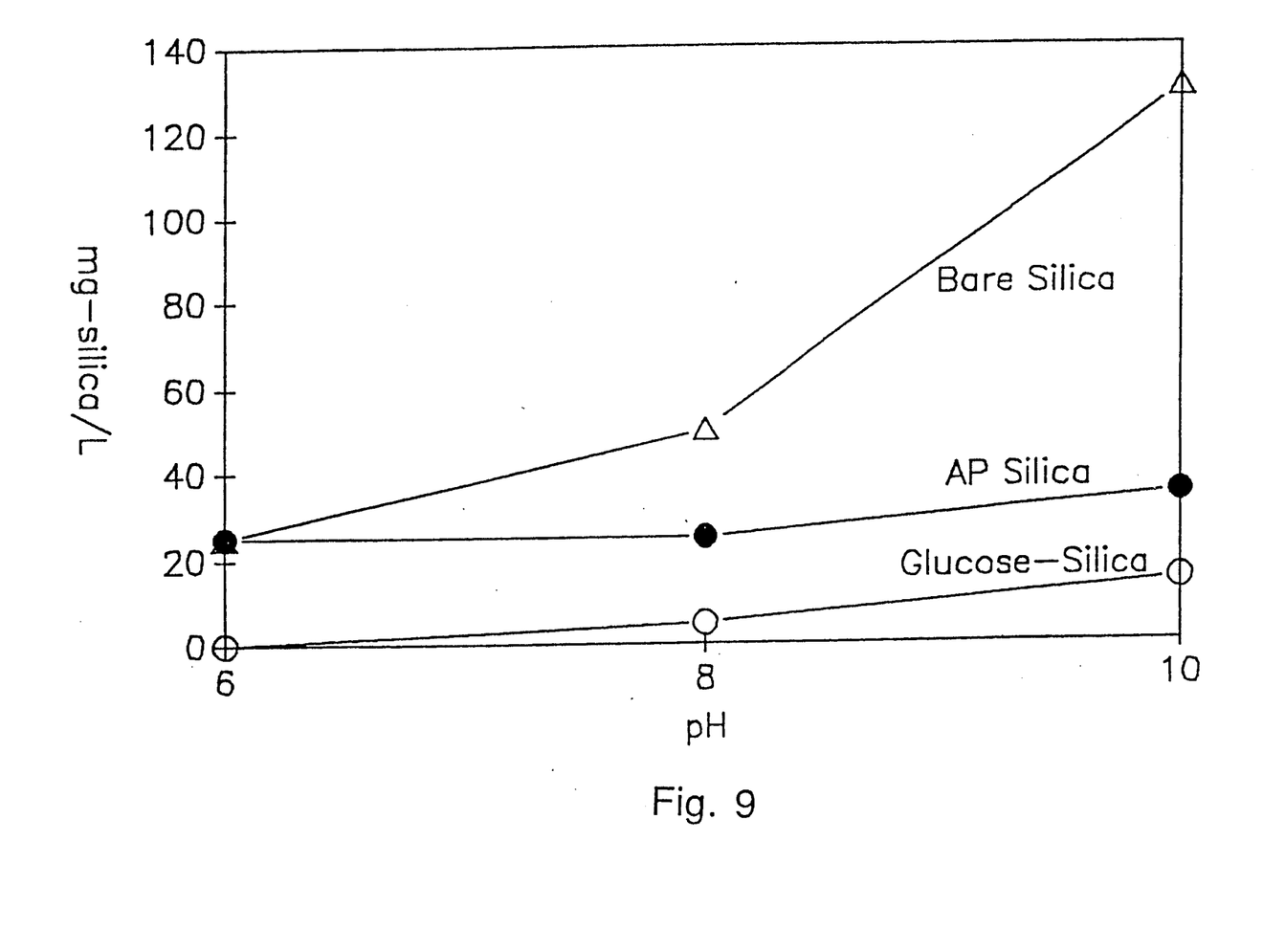
FIG. 9 is a graph of the amount of silica dissolved from various types of silica gels (open circles=glucose silica; closed circles=aminopropyl-silica, AP-silica; open triangles=underivatized silica, Bare Silica) at pH 6, 8 and 10.

Three silica derivatives (underivatized silica, 3-aminopropyl-silica, and glucose-silica) were compared. Each silica was treated with buffers at pH 6, 8 and 10 (50 mM each in Tris, imidazole and boric acid titrated to the desired pH) for two hours. The mixtures were then centrifuged and the supernatant were removed for determination of dissolved silica. The results are shown in FIG. 9. The glucose-silica showed strong pH resistance as compared to either the underivatized silica or 3-aminopropylsilica. For example, the pH 10 buffer dissolved only 0.01% of the glucose-silica in two hours, as opposed to 0.13% for the bare silica.

The present invention provides a method for preparing a medium for separating biological materials using high pressure gel filtration chromatography. The sugar-silica medium of the present invention provides a distinct advantage over media previously available. For example, a glucose-silica medium provides greater resolution as well as greater ability to separate biological materials by molecular weight.

Although particular embodiments of the invention have been discussed, it will be understood that these are examples that were described for the purposes of illustration and that the invention is capable of numerous modifications without departing from the spirit of the invention. In particular, it is noted that a wide variety of pore sizes may be used to prepare the media of the present invention. In addition, various aminoalkyl-silica supports may be used to prepare the media of the present invention. Further, the reaction described may be performed with various aldose or ketose sugars and with monosaccharides and disaccharides.

Various of the features of the invention which are believed to be new are set forth in the appended claims.

We claim:

1. A method for preparing a pressure stable and pH stable medium for use in high pressure gel filtration chromatography (HPGFC), the method comprising treating aminoalkyl-silica with a sugar selected from the group consisting of aldose monosaccharides, aldose disaccharides, ketose monosaccharides, and ketose disaccharides in the presence of sodium cyanoborohydride at a temperature of from about 50° C. to about 70° C. for a period of time of from about 4 hours to about 6 hours, washing the resulting medium, and drying the medium.

2. The method of claim 1 wherein the aminoalkyl-silica is 3-aminopropyl-silica.

3. The method of claim 1 wherein the sugar is selected from the group consisting of glucose, maltose and glucuronic acid.

4. The method of claim 1 wherein the temperature is about 60° C. and the period is about 5 hours.

* * * * *